(12) United States Patent
Ngo et al.

(10) Patent No.: US 7,304,957 B2
(45) Date of Patent: Dec. 4, 2007

(54) METHODS AND SYSTEMS FOR SIMULTANEOUS, MULTI-CHANNEL LINK FAULT SECTIONALIZATION TESTING

(75) Inventors: Lam T. Ngo, Raleigh, NC (US); Erick T. Swanson, Cary, NC (US); Peter J. Marsico, Chapel Hill, NC (US)

(73) Assignee: Tekelec, Morrisville, NC (US)

(*) Notice: Subject to any disclaimer, the term of this patent is extended or adjusted under 35 U.S.C. 154(b) by 695 days.

(21) Appl. No.: 10/929,292

(22) Filed: Aug. 30, 2004

(65) Prior Publication Data
US 2005/0185590 A1 Aug. 25, 2005

Related U.S. Application Data

(60) Provisional application No. 60/545,874, filed on Feb. 17, 2004.

(51) Int. Cl.
*H04J 1/16* (2006.01)
(52) U.S. Cl. ............ 370/241; 370/242; 370/347; 379/26.02
(58) Field of Classification Search ............ 370/241, 370/242, 243, 244, 245, 246, 247, 248, 249, 370/252, 321, 337, 347; 379/26.02; 714/798
See application file for complete search history.

(56) References Cited

U.S. PATENT DOCUMENTS 5,197,062 A * 3/1993 Picklesimer ............... 370/508
5,343,461 A 8/1994 Barton et al.
5,457,729 A 10/1995 Hamann et al.
5,659,570 A 8/1997 Cotreau et al.
5,848,127 A 12/1998 Levitan et al.
6,092,040 A 7/2000 Voran
6,341,158 B1 1/2002 Corso, III et al.
6,421,323 B1 * 7/2002 Nelson et al. ............... 370/249

OTHER PUBLICATIONS

Xu, Qiao, MPLT Control FPGA, High Level Design HD005041 Rev. 4.0, Sections 4.1.1.2 and 5.1.1.14 (unpublished, document dated Dec. 12, 2001).
Xu, Qiao, MPL TAXI Replacement, Eagle® /$IP^7$ Technical Reference TR005225 Rev. 2.0, Section 2.1 (Unpublished, document dated Dec. 11, 2001).
Barrowman, Dan, Jerzak, Phillip, Multi-Port LIM Control FPGA, HIgh Level Design, HD002744 Rev. 1.11, Sections 4.1.3 and 5.1.1.14-5.1.1.14.8 (unpublished, document dated Oct. 4, 2001).

* cited by examiner

*Primary Examiner*—Chi Pham
*Assistant Examiner*—Alexander O. Boakye
(74) *Attorney, Agent, or Firm*—Jenkins, Wilson, Taylor & Hunt, P.A.

(57) ABSTRACT

Method and systems for simultaneously performing link fault sectionalization (LFS) tests for multiple time division multiplexed (TDM) channels are disclosed. An LFS test state machine may simultaneously process test data for multiple TDM channels by receiving test data associated with the TDM channels, accessing stored LFS state information associated with the TDM channels from an LFS state storage element, sequentially processing the test data for the channels, generating new LFS state information for each channel, and storing the new LFS state information in the LFS state storage element.

42 Claims, 12 Drawing Sheets

US 7,304,957 B2

METHODS AND SYSTEMS FOR SIMULTANEOUS, MULTI-CHANNEL LINK FAULT SECTIONALIZATION TESTING

RELATED APPLICATIONS

This application claims the benefit of U.S. Provisional Patent Application Ser. No. 60/545,874, filed Feb. 19, 2004, the disclosure of which is incorporated herein by reference in its entirety.

TECHNICAL FIELD

The present invention relates to link fault sectionalization testing. More particularly, the present invention relates to simultaneous, multi-channel link fault sectionalization testing.

BACKGROUND ART

In signaling system 7 (SS7) telecommunications signaling networks, signal transfer point (STP) nodes terminate SS7 signaling links that carry signaling data. SS7 signaling links terminated by an STP are typically 56 kbps or 64 kbps DS-0 links. In order to transfer signaling information across long distances, many DS-0 channels may be multiplexed into a single high-speed channel, such as a DS-1 or E1 channel. A DS-1 channel uses a T1 carrier, which operates at 1.544 Mbps, while an E1 channel uses a carrier that operates at 2.048 Mbps. As transmission distances increase and the number of intermediate signal processing/handling components (e.g., signal regenerators, cross-connects, patch panels, etc.) increase, the potential for link failures or degradations in link quality also increases. Consequently, link fault sectionalization testing techniques have been developed to monitor and diagnose signaling link transmission problems.

Link fault sectionalization (LFS) is a technique that allows a node within a signaling network to test links, so as to determine where in the network a fault or failure is occurring. The node initiating a LFS test is able to send patterns along the path of the signaling link and place successive downstream nodes into a loopback mode of operation. The node then analyzes the patterns that come back to determine if there is a fault between the sending node and a remote node One significant limitation of current LFS test systems involves the fact an LFS controller can only control and test one channel of a TDM facility (e.g., a T1 or E1 trunk) at a time. This limitation is generally illustrated by the LFS loopback test scenario presented in FIG. 1. FIG. 1 illustrates a signaling environment 100, which includes a first signal transfer point (STP) node 102 and a second STP node 104, which are connected via a TDM T1 trunk 106. TDM trunk 106 includes 24 individual DS-0 signaling channels, including a signaling channel 108. Because of the physical distance separating the STP pair, a T1 repeater element 110 is employed to perform intermediate regeneration of any signals communicated on the T1 span connecting the STP pair. As such, the repeater element 110 effectively divides the T1 span into two span segments, a first span segment 112 and a second span segment 114. In the event of a communication problem involving T1 trunk 106, STP node 102 may initiate an LFS loopback test in order to locate or isolate the T1 span segment that is responsible for the communication difficulty. More particularly, STP node 102 may select a single DS-0 signaling channel, in this case signaling channel 108, and place the signaling link channel in loopback mode. LFS diagnostics may be performed on the single channel over span segment 112. Once the test for the first channel is completed, the test must be repeated for each individual channel until the fault is isolated. Thus, current LFS test systems require that tests for individual channels be run serially.

In other words, an LFS controller function associated with STP node 102 is dedicated to processing a single channel of the TDM signaling facility for the duration of an LFS test. Consequently, each time that a different signaling channel or link needs to be tested, an operator must manually reconfigure the LFS controller to test the desired TDM channel. This operating limitation becomes significantly burdensome when it is considered that, as part of link installation, network operators typically run LFS tests for up to 24 consecutive hours on a single, specific link to assess the bit error rate (BER) characteristics of that link. Consequently, per link LFS testing on an entire communication trunk (e.g., a T1 trunk) could take weeks. Furthermore, network elements are becoming increasingly capable of handling higher link density communication interfaces, which will only serve to exacerbate this problem.

Accordingly, there exists a long-felt need for improved methods and systems for performing LFS testing in a communications network.

DISCLOSURE OF THE INVENTION

According to one aspect, the present invention includes a network routing node, such as a signaling system 7 (SS7) signal transfer point (STP) or signaling gateway (SG), that terminates multiple signaling communication links and simultaneously performs link fault sectionalization (LFS) testing on some or all of the links. An STP node may include a communications link interface module that terminates a time division multiplexed (TDM) T1 trunk, where the trunk includes 24 DS-0 signaling link channels. To efficiently facilitate LFS testing of the trunk, a single LFS state machine may service some or all of the signaling channels associated with the trunk. The LFS state machine may simultaneously perform LFS testing on some or all of the 24 associated DS-0 channels by periodically storing, retrieving and processing LFS state information related to each signaling channel. As such, a single LFS state machine may be shared or multi-tasked among multiple channels of a TDM trunk.

In an extension of the technique described above, signaling channels associated with multiple TDM trunks may be serviced by a single LFS state machine, thereby minimizing the amount of LFS-related resources required to support simultaneous LFS testing of multiple TDM facilities.

The LFS state machine may be implemented using a microprocessor or a programmable logic component, such as a field programmable gate array (FPGA), which may be located on the link interface module.

As used herein, the term "link fault sectionalization test" is intended to refer to generically to any suitable loopback-based test of a TDM channel associated with a signaling link in which testing for each channel is implemented using a state machine. One example of such a test is the LFS test used for testing TDM-based SS7 signaling links. However, as will be described in detail below, the multi-channel LFS test methods and systems described herein may be used to test other types of TDM channels, including bearer channels and non-SS7 signaling channels.

Accordingly, it is an object of the present invention to provide methods and systems for simultaneously testing multiple communications links.

It is another object of the present invention to provide a link interface module for simultaneously testing multiple communication channels.

It is yet another object of the present invention to provide an LFS state machine for simultaneously testing multiple communication channels.

It is yet another object of the present invention to provide methods and systems for reducing the time required to perform LFS bit error rate (BER) testing on multiple signaling links.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings, of which.

DETAILED DESCRIPTION OF THE INVENTION

Figure 1:
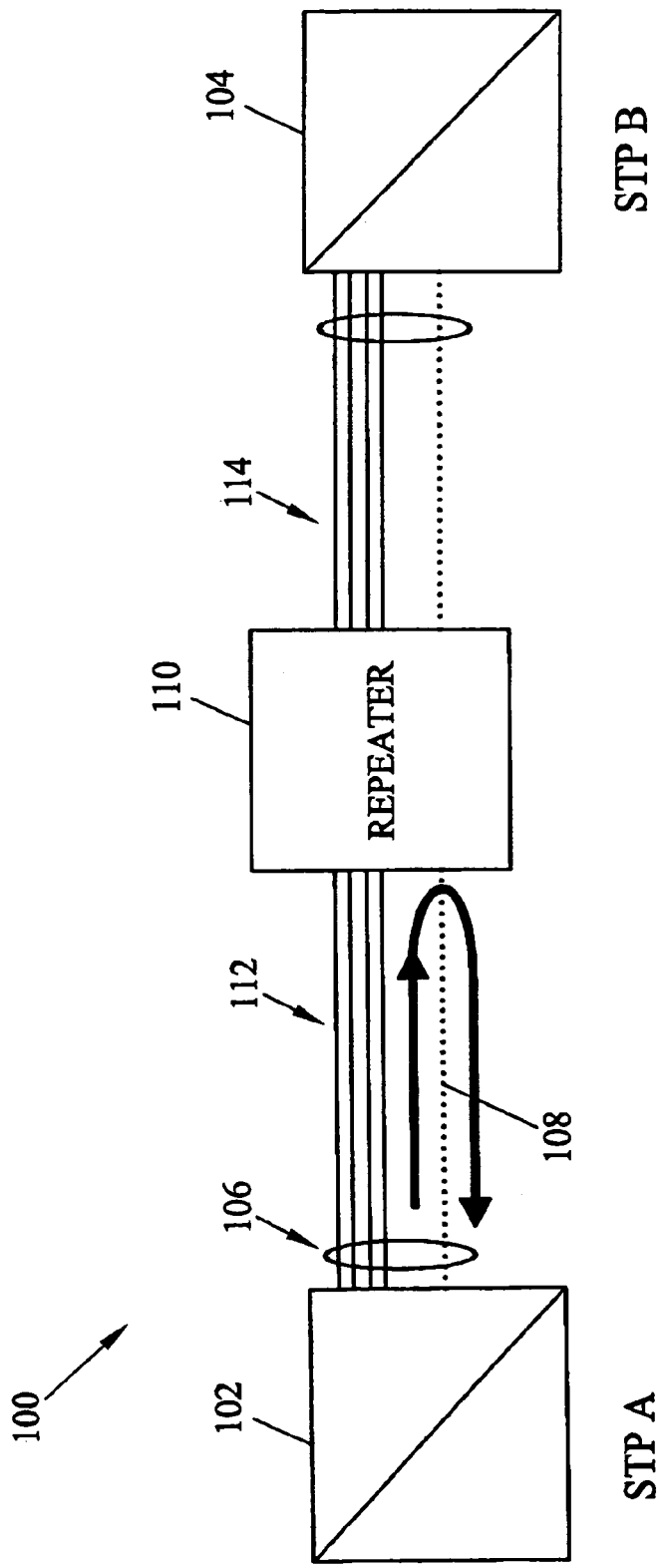
FIG. 1 is a network diagram that illustrates conventional single-channel link fault sectionalization (LFS) loopback testing capability in a signaling network.
Figure 2:
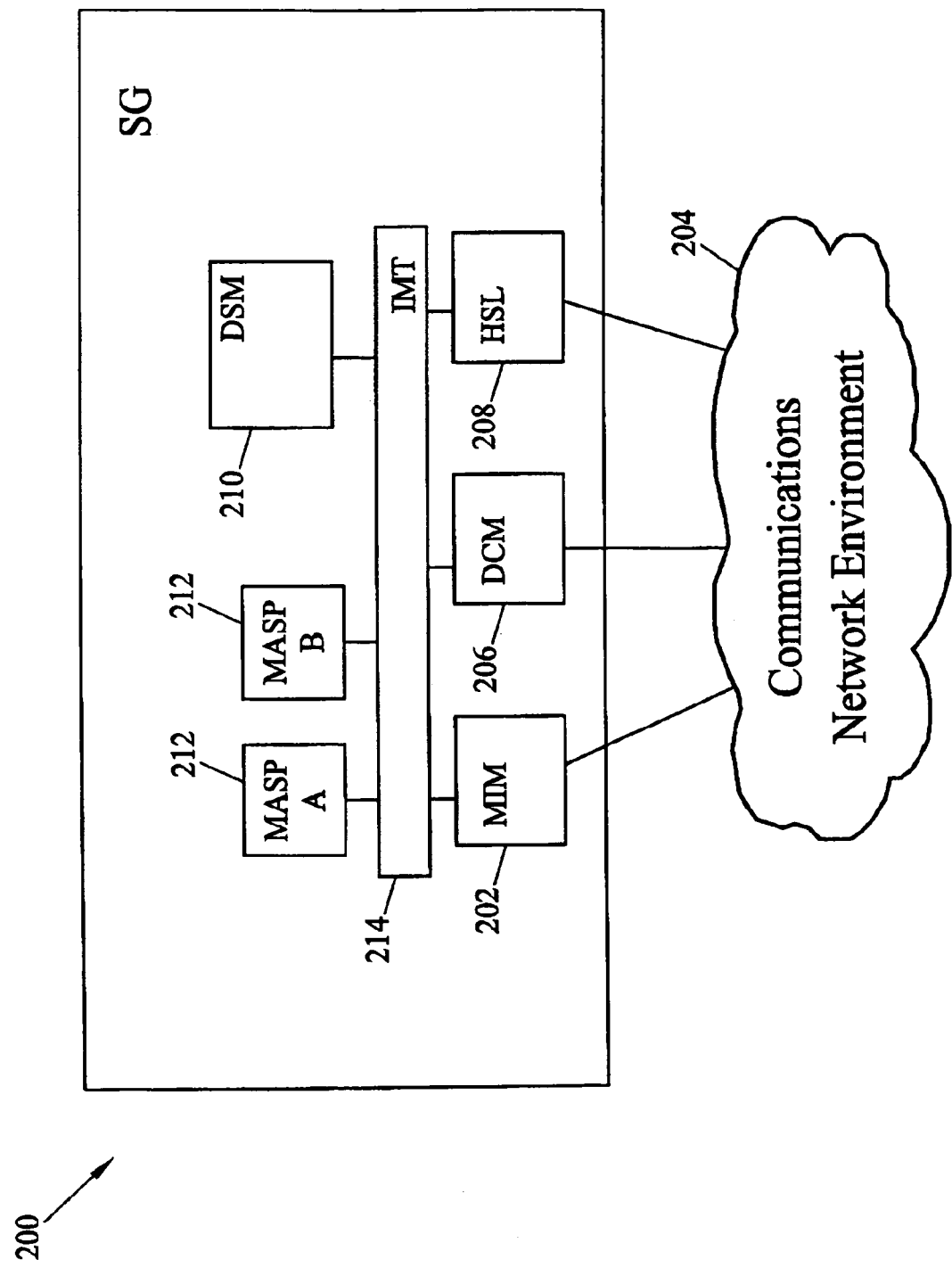
FIG. 2 is a block diagram illustrating an exemplary internal architecture of a signaling gateway (SG) routing node for use with embodiments of the present invention.

FIG. 2 illustrates an exemplary internal architecture of a signaling gateway (SG) router 200 suitable for use with embodiments of a multi-channel link fault sectionalization (LFS) test system of the present invention. It will, however, be appreciated that the present invention is not limited to deployments in network routing nodes and may be implemented in any signaling node that communicates via a time division multiplexed (TDM) facility (e.g.,. T1, E1, OC-n, etc.). Furthermore, the present invention may be employed to provide simultaneous, multi-channel bit error rate (BER) testing capability in signaling environments where conventional LFS testing is not used (e.g., E1 signaling environments). In addition, as will be described below, the multi-channel link integrity test methods described herein may also be used to test bearer channel integrity.

Referring to FIG. 2, SG 200 includes a multi-port link interface module (MIM) 202 for interfacing directly with one or more T1 or E1 signaling trunks that are associated with a communications network environment 204. Communications network environment 204 may carry multiple channels of signaling data, bearer data, or signaling data and bearer data. SG 200 also includes a data communications module (DCM) 206 for sending and receiving signaling messages (i.e., signaling system 7 messages, session initiation protocol messages, etc.) over an Internet protocol (IP) communication link, and a high-speed link module (HSL) 208 for sending and receiving signaling messages over an asynchronous transfer mode (ATM) communication link.

SG 200 may also include one or more internal processing modules, such as database services module (DSM) 210 and administrative modules 212 that do not interface directly with external signaling links. For example, DSM 210 may provide database-related services, such as global title and number portability translations. Administrative module 212 may perform database provisioning and other administrative functions.

Each of the modules within SG 200 may be a printed circuit board with one or more processors mounted thereon. In one exemplary implementation, each module may include an application processor for executing application programs and a communications processor for communicating with other modules. Modules 202, 206, 208, 210 and 212 may be connected by one or more buses 214 for providing interprocessor communications. In one exemplary implementation, buses 214 may include a pair of counter-rotating rings.

As stated above, MIM 202 is preferably capable of interfacing directly with multiple T1 or E1 signaling trunk facilities that include both signaling and bearer data and for loading outbound signaling links with either or both types of data. In addition to loading outbound signaling links with multiple types of data, MIM 202 may perform cross-connect functions where data from one high-speed signaling link is transmitted over time slots in another signaling link of the same speed. MIM 202 may also perform a multiplexing function where data received over multiple high-speed links, such as T1 links, are multiplexed and sent over a higher-speed link of the same or of a different type, such as a T3 or an OC-3 link. A more detailed discussion of multi-port drop/add multiplexing functionality can be found in commonly assigned, co-pending U.S. patent application Ser. No. 10/225,998, filed Aug. 22, 2002, the disclosure of which is incorporated herein by reference in its entirety.

Exemplary Communication Module Architecture

Figure 3:
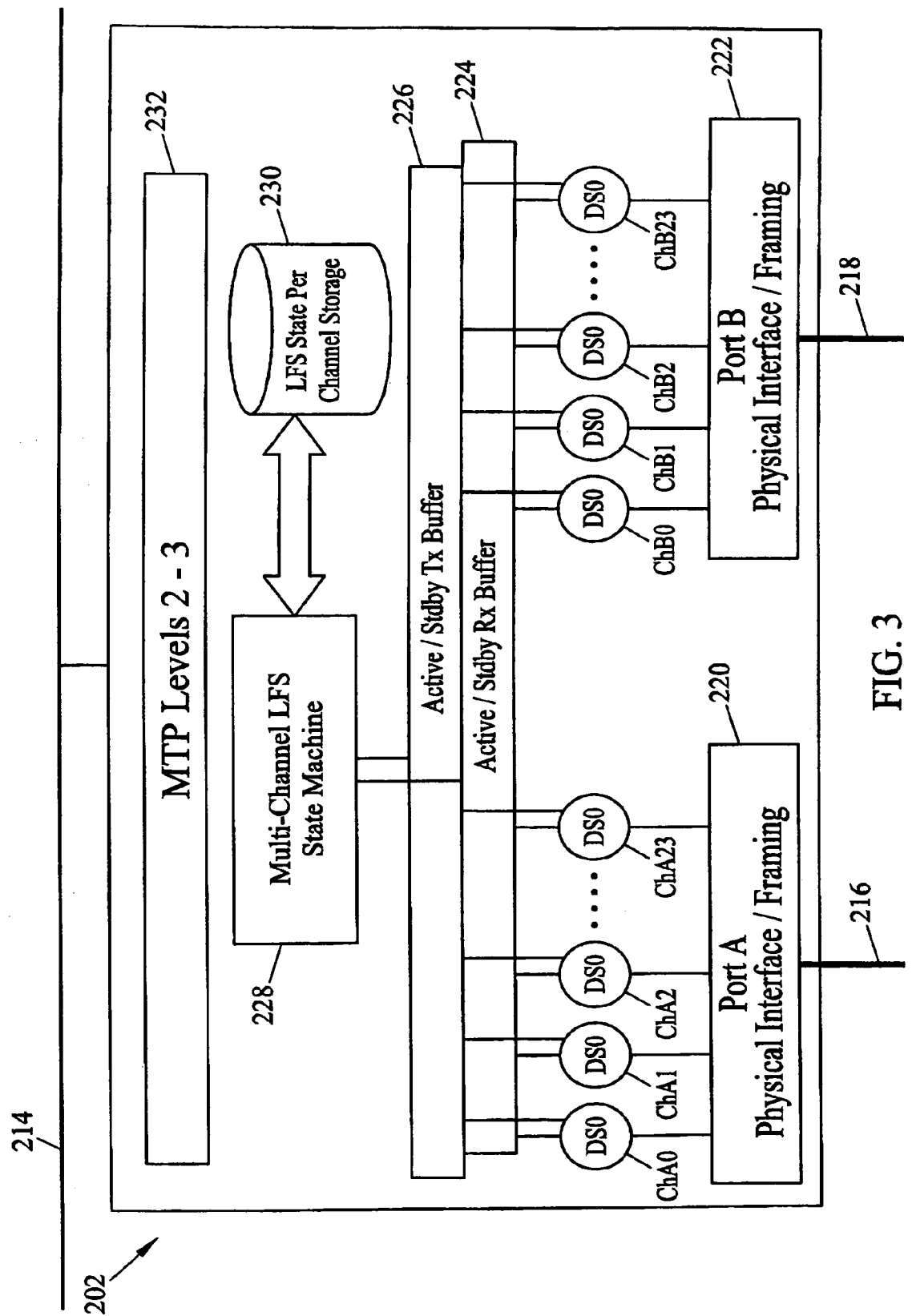
FIG. 3 is a block diagram illustrating an exemplary communication module with an implementation of a multi-port, multi-channel LFS testing system according to an embodiment of the present invention.

FIG. 3 illustrates an exemplary architecture of a communication module that includes simultaneous, multi-channel LFS testing functionality associated with the present invention. More particularly, FIG. 3 is a block diagram of MIM module 202 that terminates a pair of T1 trunks 216 and 218 via physical interfaces 220 and 222, respectively. T1 trunk 216 may carry 24 DS-0 channels, identified in FIG. 3 as channels ChA0 through ChA23. Similarly, T1 trunk 218 may carry 24 DS-0 channels, ChB0 through ChB23. MIM 202 includes a receive-side (Rx) buffer system 224, as well as a transmit-side (Tx) buffer system 226. In one embodiment, buffer systems 224 and 226 may each include active and standby buffer components. Such an active/standby buffer configuration enables one buffer to be loaded (i.e., the standby buffer), while the other buffer (i.e., the active buffer) is being actively used for LFS processing. At the appropriate time, the contents of the standby buffer may be transferred to the active buffer, or the active/standby buffer designations may be swapped, thereby making the standby buffer the new active buffer, and vice versa. The active/standby buffer configuration will be described in detail below. It should be appreciated that the ability to temporarily buffer Rx and Tx data is particularly useful in implementations of the present invention involving the simultaneous LFS testing of channels associated with multiple TDM trunks. In scenarios involving the simultaneous LFS testing of multiple channels associated with a single TDM trunk, active and standby Tx/Rx buffers may not be required.

In FIG. 3, an LFS state machine 228 reads channel-specific data from Rx buffer 224 and writes channel-specific data to Tx buffer 226. LFS state machine 228 may also access LFS state storage 230. MIM 202 may also include a message transfer part (MTP) function 232 for implementing signaling system 7 (SS7) MTP layers 2 and 3, which includes SS7 data link level services and SS7 network level services, such as routing, message discrimination, and message distribution.

Using data obtained from Rx buffer 224 and previous LFS state data retrieved from storage 230, LFS state machine 228 may execute one or more LFS tests, including bit error rate (BER) tests. LFS state machine 228 may respond to or initiate LFS tests in one of several LFS test modes, including latching, non-latching, and manual test modes.

LFS Test Modes

To better illustrate an LFS testing embodiment of the present invention, an overview of the various LFS test modes with respect to the testing of a single DS-0 channel will now be described. While the description that follows relates to the testing of a single channel, it will be appreciated that a multi-channel LFS testing system of the present invention may simultaneously perform similar tests on multiple DS-0 channels.

During the latching loopback mode test of a DS-0 channel, LFS state machine 228 may transmit LFS commands to a remote node. The commands may instruct the node to loop back all data subsequently received on a particular DS-0 channel or link. After receiving confirmation from the remote node that the command has been received, LFS state machine 228 transmits test patterns and then analyzes the returned data for errors. The remote node stays latched in loopback mode until the LFS state machine transmits commands that instruct the remote node to end the loopback test.

Figure 4:
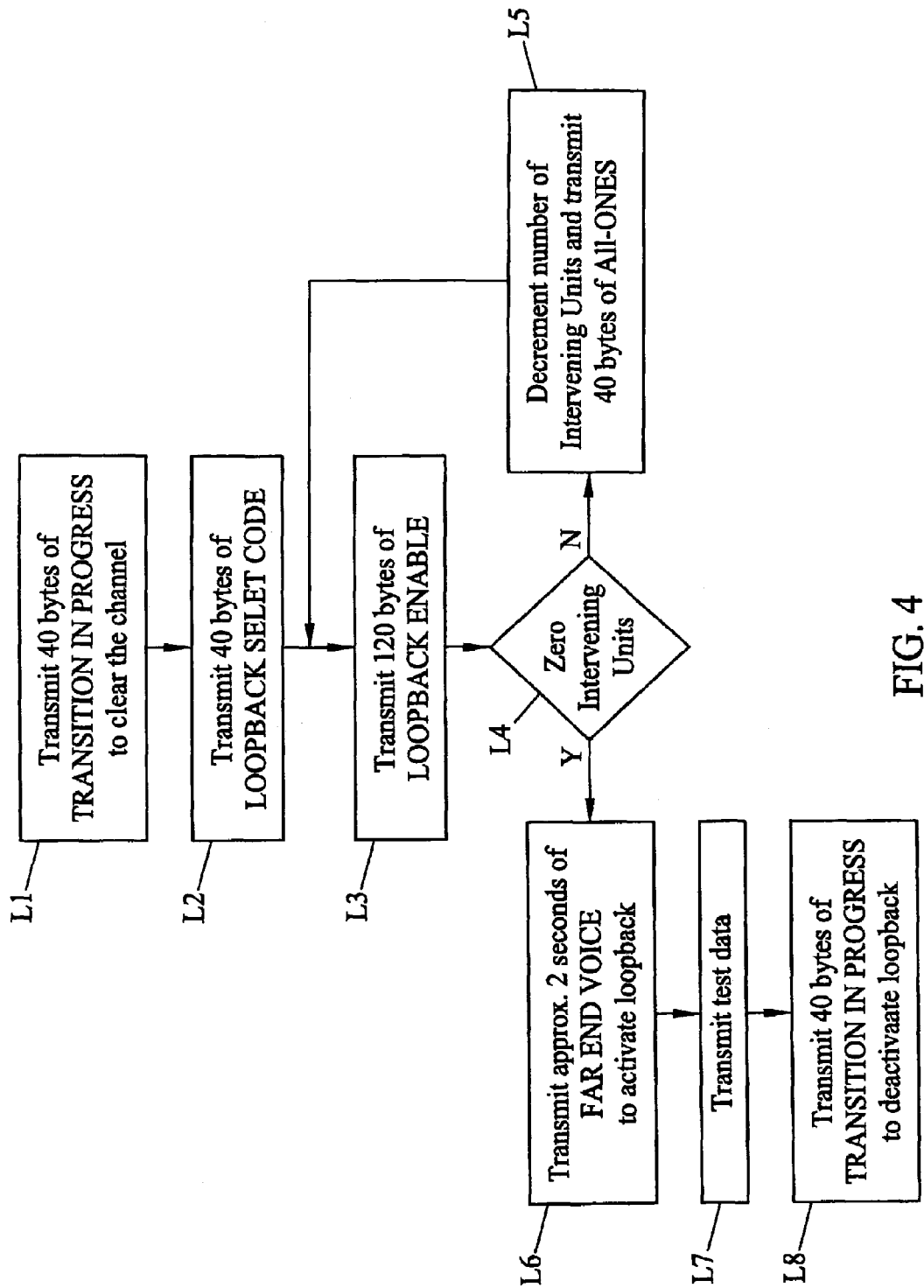
FIG. 4 is a flow chart illustrating steps performed by a latching loopback initialization state machine suitable for use with embodiments of the present invention.

FIG. 4 is a process flow diagram that illustrates an exemplary LFS latching loopback mode test suitable for use with embodiments of the present invention. In conjunction with FIG. 4, Tables 1 through 3 provided below summarize various LFS standard commands and service codes that may be used during a typical latching loopback mode LFS test. Table 1 provides a summary of LFS latching loopback mode commands, including a function name and corresponding DS-0 8-bit value. Table 2 provides a summary of LFS latching loopback selection codes, including a looping point selection identifier and corresponding DS-0 8-bit value. Table 3 provides a summary of LFS latching loopback test patterns and associated descriptions.

TABLE 1

LFS Latching Loopback Commands

| FUNCTION | DS-0 Bit Pattern (lsb) B1 | B2 | B3 | B4 | B5 | B6 | B7 | (msb) B8 |
|---|---|---|---|---|---|---|---|---|
| IDLE | X | 1 | 1 | 1 | 1 | 1 | 1 | 0 |
| FAR END VOICE | X | 1 | 0 | 1 | 1 | 0 | 1 | 0 |
| LOOPBACK ENABLE | X | 1 | 0 | 1 | 0 | 1 | 1 | 0 |
| ALL ONES | X | 1 | 1 | 1 | 1 | 1 | 1 | 1 |
| TRANSITION IN PROGRESS | X | 0 | 1 | 1 | 1 | 0 | 1 | 0 |

Note:
Bit 1 is transmitted first.
X - Set to 1 for transmission of codes. Ignored on reception of codes

TABLE 2

LFS Latching Loopback Selection Codes

| Looping Point | DS-0 Bit Pattern (lsb) B1 | B2 | B3 | B4 | B5 | B6 | B7 | (msb) B8 |
|---|---|---|---|---|---|---|---|---|
| DS-0 Dataport - Drop Side | X | 0 | 0 | 0 | 0 | 1 | 0 | 1 |
| DS-0 Dataport - Line Side | X | 0 | 0 | 0 | 0 | 1 | 0 | 1 |
| OCU Dataport | X | 1 | 0 | 1 | 0 | 1 | 0 | 1 |
| CSU Dataport | X | 0 | 1 | 1 | 0 | 0 | 0 | 1 |
| DSU Dataport | X | 1 | 1 | 1 | 0 | 1 | 1 | 1 |
| Network Element Interface | X | 1 | 0 | 0 | 0 | 0 | 0 | 1 |

TABLE 3

LFS Latching Loopback Test Patterns

| TEST PATTERN | DESCRIPTION |
|---|---|
| 511 Pseudo-Random | Random data is generated by a 9-bit shift register with exclusive OR feedback. The output of bit 5 is XOR'd with the output of bit 9; the result is fed back into the input of bit one and also shifted out. |
| 2047 Pseudo-Random | Random data is generated by an 11-bit shift register with exclusive OR feedback. The output of bit 9 is XOR'd with the output of bit 11; the result is fed back into the input of bit one and also shifted out. |
| Software Defined Octet | Transmitted continuously until disabled. This pattern or "software defined octet", is written in a "user defined test pattern" register prior to the start of the test. |
| Alternate | Continuously transmit 100 bytes of a software-defined octet followed by 100 bytes of 0x00h until disabled. This pattern or "software defined octet", is written in a "user defined test pattern" register prior to the start of the test. |

Referring to FIG. 4, in step L1 of the process flow, LFS state machine 228 may transmit to a remote node, during the time intervals associated with the DS-0 channel under test, 40 bytes of the "transition in progress" command in order to clear the channel. In step L2, 40 bytes of an appropriate loopback selection code are transmitted by LFS state machine 228. Next, 120 bytes of the "loopback enable" command are transmitted by state machine 228, as indicated in step L3. A check is next performed to determine if the number of intervening units is equal to 0 (step L4). By definition, the number of intervening units is one less than the total of identical equipment in tandem. For example, if there are three repeaters in tandem on a link and it is desired to perform LFS testing at the third repeater, the number of intervening units would be two. If it is desired to perform LFS testing at the second repeater, then the number of intervening units would be one.

If the number of intervening units is not equal to zero, the number of intervening units is decremented by one and 40 bytes of all 1's (i.e., 11111111 binary) are transmitted by state machine 228 (step L5), followed by the re-transmission of 120 bytes of the "loopback enable" command (step L3). This re-transmission loop is performed until the number of intervening units is reduced to 0. At that point, state machine 228 may transmit approximately 2 seconds of the "far end voice" command to the remote node, in order to place the remote node in loopback mode (step L6). State machine 228 next begins transmitting test data, as indicated in step L7. Once test data transmission is completed, 40 more bytes of the "transition in progress" command are transmitted in order to deactivate loopback at the remote node (step L8).

In the case of a non-latching loopback mode test, LFS state machine 228 may transmit LFS commands to a remote node, which instruct the node to loop back all data subsequently received on a particular DS-0 channel or link. After receiving confirmation from the remote node that the selection code has been received, LFS state machine 228 transmits test patterns along with commands that instruct the remote node to remain in loopback mode. As long as the LFS state machine transmits LFS data and the appropriate non-latching test mode commands, the remote node remains in loopback mode. Once LFS state machine 228 stops transmitting LFS data, the remote node exits the loopback test mode and returns to normal operation. Table 4 summarizes various LFS non-latching selection codes, including a function name and corresponding DS-0 8-bit value, which may be used during a typical non-latching loopback mode LFS test.

TABLE 4

LFS Non-Latching Loopback Selection Codes

| | (lsb) | | DS-0 Bit Pattern | | | | (msb) |
|---|---|---|---|---|---|---|---|
| FUNCTION | B1 | B2 | B3 | B4 | B5 | B6 | B7 | B8 |
| IDLE | X | 1 | 1 | 1 | 1 | 1 | 1 | 0 |
| DSU LOOPBACK | X | 0 | 1 | 0 | 1 | 1 | 0 | 0 |
| OCU LOOPBACK | X | 0 | 1 | 0 | 1 | 0 | 1 | 0 |
| CHANNEL (CSU) LOOPBACK | X | 0 | 1 | 0 | 1 | 0 | 0 | 0 |

Note:
Bit 1 is transmitted first.
X - Set to 1 for transmission of codes. Ignored on reception of codes A manual loopback test can be performed when a remote node has already been placed in loopback by means other than LFS state machine 228. In this case, LFS state machine 228 can transmit and analyze returned test patterns, such as patterns similar to those presented in Table 3, without using LFS test mode initiating commands.

In addition to initiating LFS tests (i.e., initiating the transmission of LFS test data), a node may passively participate in an LFS test by being placed into a loopback mode of LFS operation. In loopback mode, data received on the LFS test channel is simply returned or looped back to the originator of the LFS test data. In this way, the LFS test data originator or initiator may receive and analyze the returned data to determine if errors are being introduced on the channel between itself and the loopback node.

Exemplary FPGA-Based Implementation of A Multiple LFS System

Figure 5:
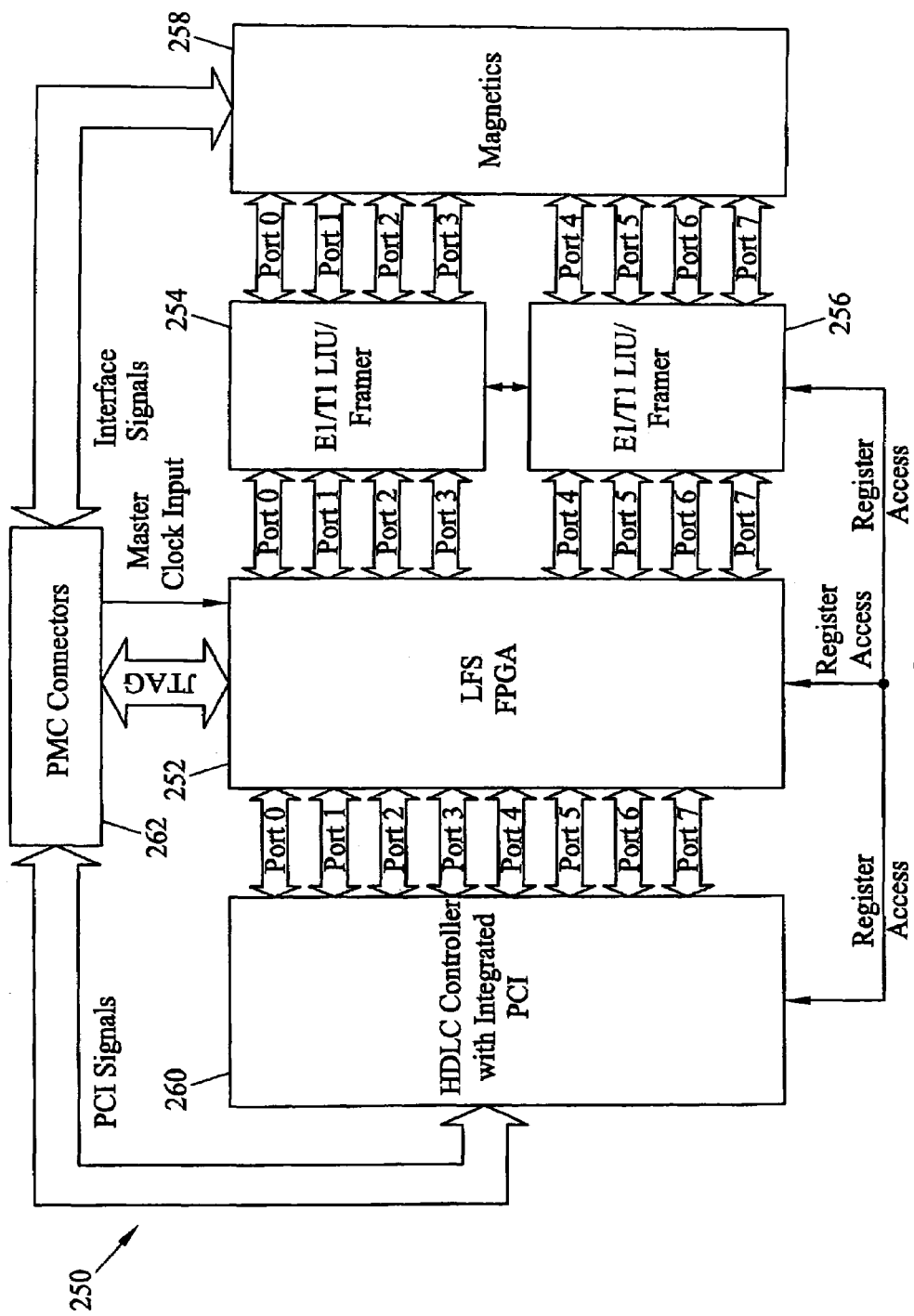
FIG. 5 is a block diagram illustrating an eight-port implementation of a multi-port, multi-channel LFS system according to an embodiment of the present invention.

FIG. 5 illustrates an exemplary implementation of a multi-channel LFS system according to an embodiment of the present invention using field programmable gate array (FPGA) technology. Exemplary system 250 includes a multi-channel LFS FPGA element 252, a pair of E1/T1 link interface unit (LIU)/framer elements 254 and 256, a physical interface/magnetics element 258, a high level data link controller (HDLC) with integrated peripheral component interconnect (PCI) element 260, and PCI mezzanine card (PMC) connector element 262. HDLC element 260 ensures that data passed up to the next layer has been received exactly as transmitted (i.e., error free, without loss and in the correct order). HDLC element 260 may also implement data flow control, which ensures that data is transmitted only as fast as the remote node can receive it. PCI functionality provides a path for data to move between an associated mezzanine processing sub-module via the PMC connection interface 262.

In the embodiment illustrated in FIG. 5, multi-channel LFS system 250 may simultaneously process some or all of the DS-0 channels associated with 8 TDM trunks, which are identified in FIG. 5 as Ports 0 through 7. Each of the ports may be individually timed and may therefore run asynchronously with respect to each other. Each TDM trunk or port makes a physical connection to system 250 via magnetics interface element 258. LIU/framer 254 provides link interface and framing support for Ports 0 through 3, while LIU/framer 256 provides similar link interface and framing support for Ports 4 through 7. LIU/framers 254 and 256 provide LFS FPGA 252 with serial data received from the physical line interface, take serial data from LFS FPGA 252, and provide the serial data to the physical line interface. Each of the serial data lines coming from the LIU/framers to the LFS FPGA 252 has an associated frame sync line which identifies and flags the beginning of a frame. In the case of a T1 carrier, a frame includes 24 8-bit DS-0 channels, which results in a frame size of 192 bits, plus one frame synchronization bit.

In one embodiment, multi-channel LFS FPGA 252 may receive frames of data associated with Ports 0 through 7 from framer elements 254 and 256 and temporarily buffer a frame of data from each port. LFS FPGA 252 may then sequentially perform LFS processing on each DS-0 channel that has been placed under test using the buffered frame data and previously stored LFS status information for each DS-0 channel under test. Previously stored LFS status information may include current state information, number of bytes of a test pattern that have been received, the last LFS byte received, the type of LFS test is being run on a channel (e.g., latching, non-latching, manual), the test pattern being transmitted, various counters which keep track of the number of bytes that have been transmitted, received, etc.

Because LFS FPGA 252 may operate at a clock speed that is much faster than the rate at which line data is received (i.e., 8000 frames per second per port), one embodiment of an LFS state machine of the present invention is capable of effectively processing each DS-0 channel of a frame before the next corresponding frame is received. As such, a fixed or constant delay of one frame is introduced into the LFS test loop.

Figure 6:
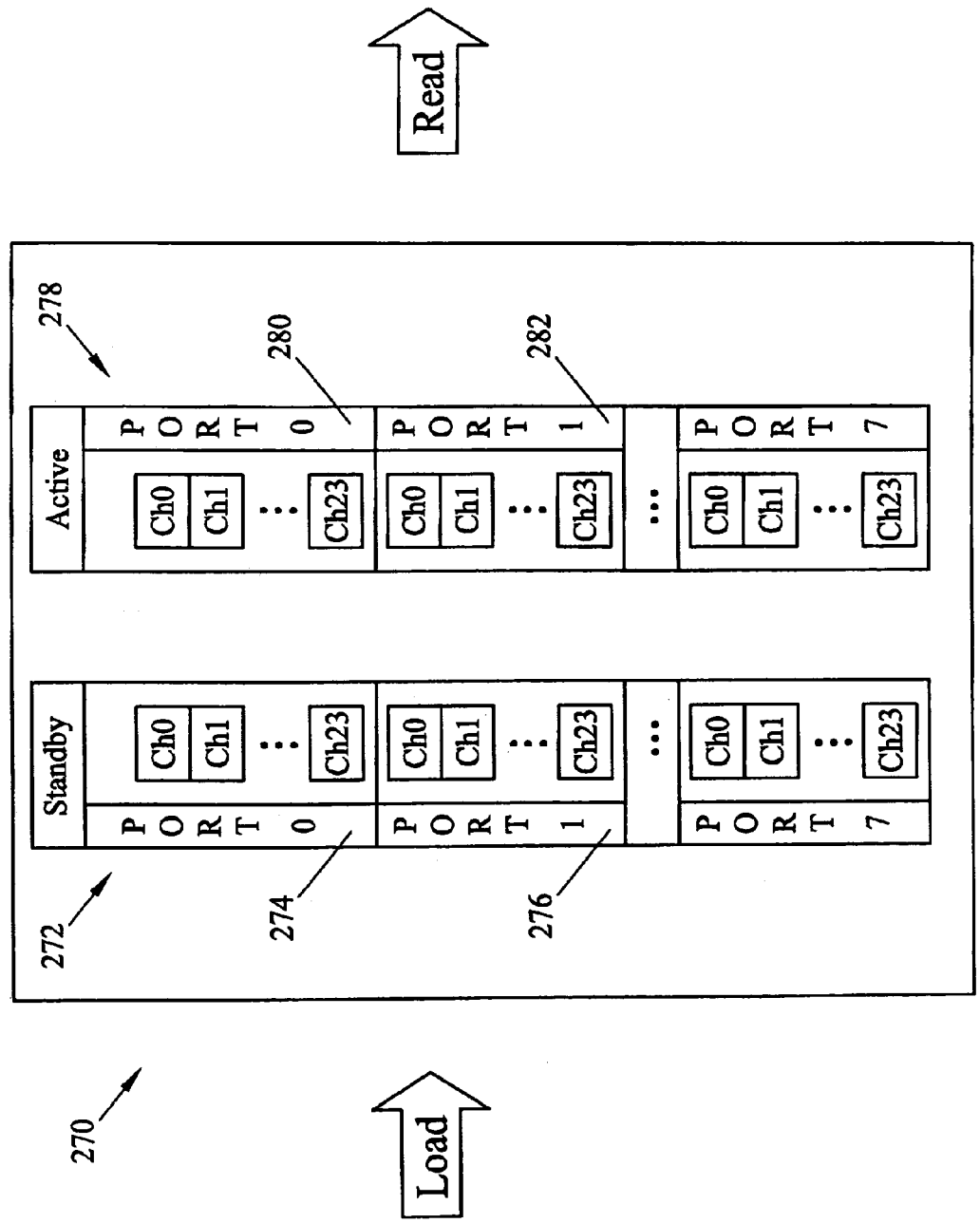
FIG. 6 is a diagram illustrating an active/standby buffer configuration associated with the eight-port embodiment illustrated in FIG. 5.

An exemplary active/standby frame buffer element 270 is illustrated in FIG. 6. In this configuration, incoming frames of data received from the physical interface are first buffered in a standby storage element 272. As such the incoming frame of data on Port 0 is stored in buffer segment 274, the incoming frame of data on Port 1 is stored in buffer segment 276, and so on until the incoming data frames associated with each port have been loaded into standby buffer 272. Once standby buffer 272 has been completely loaded, the contents of the standby buffer are transferred to an active buffer 278. The transfer may be accomplished by physically moving the memory contents of standby buffer 272 to active buffer 278, or by simply designating the standby buffer as the new active buffer and vice-versa. In any event, frame data stored in standby buffer segment 274 becomes resident in active buffer segment 280, frame data stored in standby buffer segment 276 becomes resident in active buffer segment 282. Such an active/standby buffer configuration allows incoming data to be loaded independently of any data read operations performed by the LFS state machine. It will be appreciated that in alternate embodiments, multiple frames from the same port may be buffered so as to provide additional LFS processing margin, where this processing margin is gained at the expense of requiring greater frame buffer resources and introducing a larger fixed delay into the LFS test loop.

Figure 7:
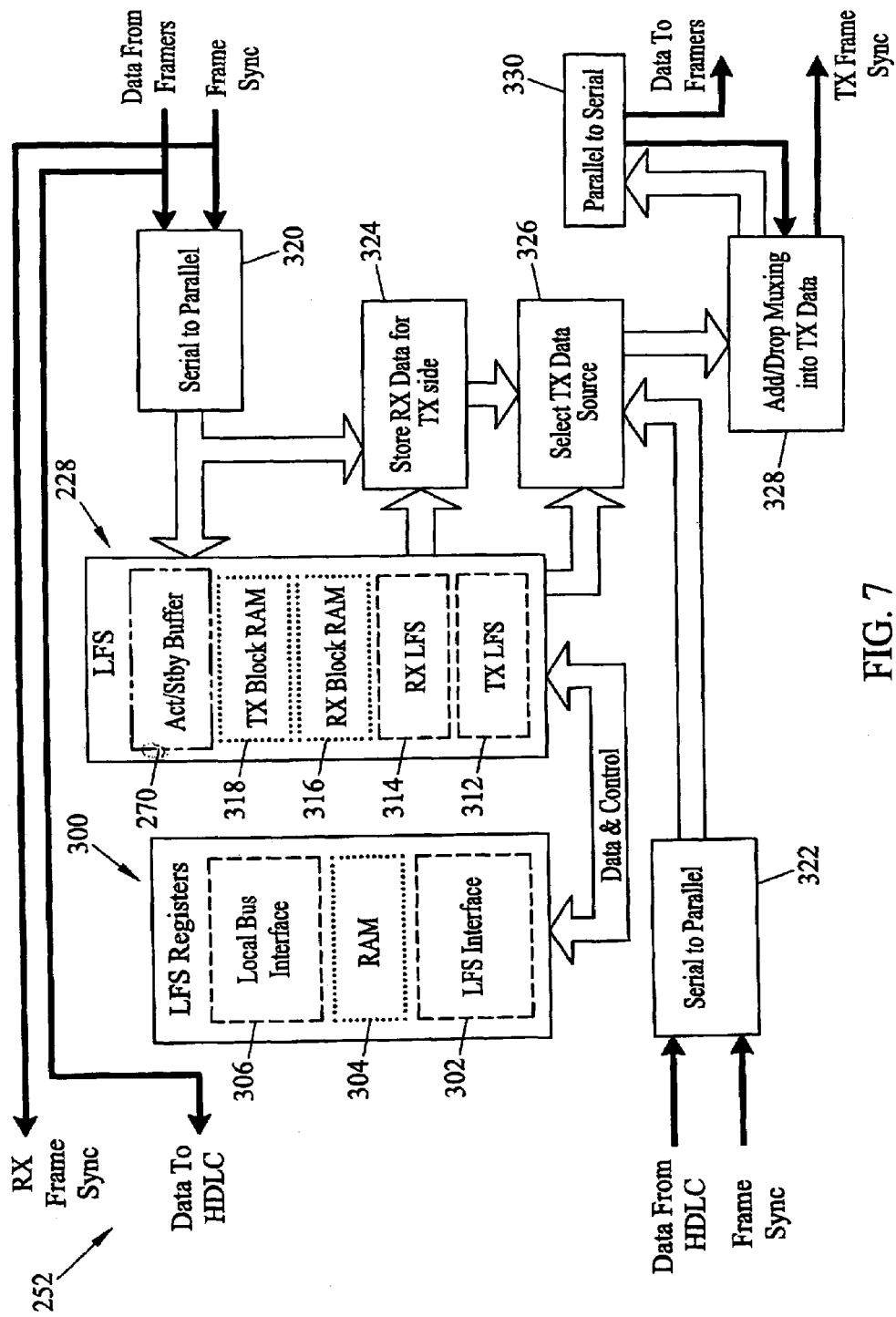
FIG. 7 is a block diagram of a field programmable gate array (FPGA) implementation of a multi-port, multi-channel LFS testing system according to an embodiment of the present invention.

FIG. 7 provides a more detailed block diagram of one embodiment of an FGPA-based multi-channel LFS system of the present invention. In FIG. 7, FPGA 252 includes an LFS register element 300, which includes an LFS interface 302, memory storage 304, and a local bus interface 306. FPGA 252 also includes a multi-channel LFS state machine 228. In FIG. 7, LFS state machine 228 includes a transmit (Tx) LFS state machine 312 and a receive (Rx) LFS state machine 314. Tx and Rx LFS state machines 312 and 314, respectively, may communicate with one another and exchange information necessary to execute an LFS test on one or more channels. Also included in element 228 are Rx and Tx LFS state storage functions 316 and 318, respectively. Rx and Tx LFS state storage functions 316 and 318 may store channel-specific state information associated with Tx and Rx state machines 312 and 314. The Tx and Rx state machines 312 and 314 may operate asynchronously with respect to one another. That is, while Rx state machine 314 is processing a first channel, Tx state machine 312 may be processing a second channel, where the first and second channels are not the same channel. While processing the first channel, Rx state machine 314 may receive and store LFS state information associated with the second channel from Tx state machine 312, and vice versa. The first and second channels referred to in the preceding example may be associated with the same or different TDM ports. An active/standby buffer 270 may temporarily buffer inbound and outbound channel/frame data, as described above. Although, the embodiment illustrated in FIG. 7 includes separate Tx and Rx state machines, the present invention is not limited to such an embodiment. In an alternate embodiment, a multi-port, multi-channel LFS system may be implemented as a single state machine with one or more associated channel-specific LFS state data storage elements.

Exemplary FPGA 252 also includes a pair of serial to parallel converters 320 and 322 for converting serial data streams into a parallel format. Converter 320 may receive incoming line data and a frame synchronization signal from a framer element and convert the data to parallel format. Converter 322 may operate in a similar manner to convert received serial data into parallel format.

FPGA 252 allows channels of data to be looped back from receive to transmit on the same port. This function may be used automatically when the system is responding to LFS initiated by a remote node or may be manually initiated by an operator for debugging purposes. When data is to be looped back from transmit to receive on the same port, the received data to be looped back is placed into a storage buffer 324 where it resides until the transmit side is ready to send that channel. At that time, a Tx data source selection element 326, which may select a particular channel of data for transmission, reads the data from storage buffer 324 and sends on the data to be transmitted. In general, data to be transmitted may come from one of several sources. When the system has initiated LFS testing, the data source will be LFS Tx state machine 228. If data from the Rx side is being looped back to the Tx side (e.g., in response to remotely initiate LFS or manually configured for loopback by an operator), the source will be Rx storage buffer 324. In the case of non-LFS (i.e., normal operation), the source will be HDLC 260.

A selected data channel may be incorporated into any available time slot on any available port via add/drop multiplexer 328. Outbound channel data from multiplexer 328 is converted from a parallel to a serial format by converter 330. Once serialized, the outbound data is directed to a framer 254 or 256, where the channel data is framed and synchronized for line transmission.

While a programmable logic or firmware implementation of a multi-channel LFS tester is described above, the present invention is not limited to such an embodiment. In an alternate embodiment of the present invention, a multi-channel LFS tester may be implemented in hardware, software, or any combination of hardware, software, and firmware without departing from the scope of the invention. For example, a multi-channel LFS tester may be implemented using a microprocessor programmed to perform the steps described herein for simultaneously testing a plurality of LFS channels. In any case, an advantage of the implementations described herein is that the LFS processing function, regardless of the implementation, is not dedicated to servicing a single channel for the duration of an LFS test. Instead, the novel architecture of the present invention enables a single LFS processing function to simultaneously perform LFS tests on multiple channels.

Exemplary LFS System Operation Scenarios

Figure 8:
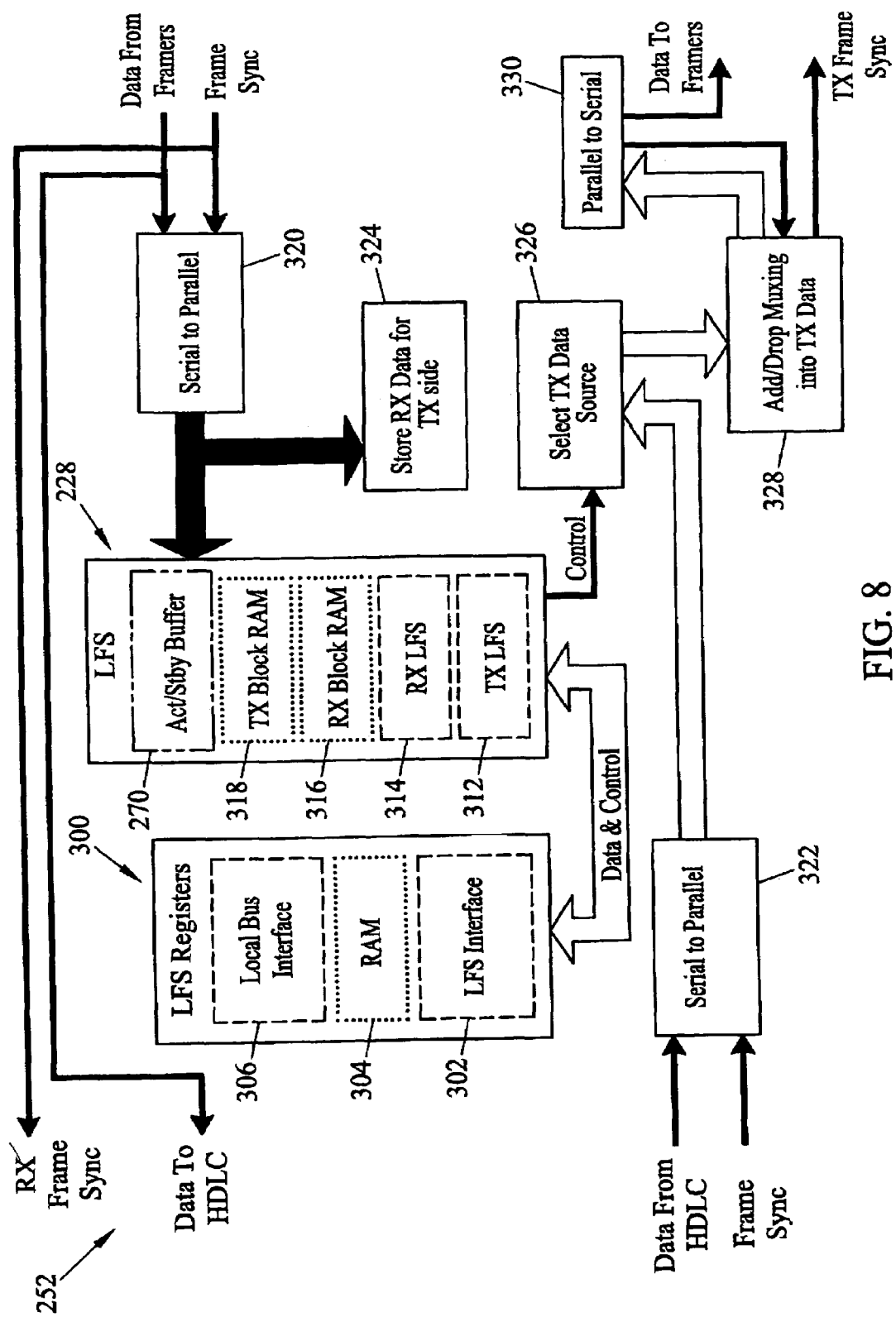
FIG. 8 is a block diagram of an FPGA implementation of a multi-port, multi-channel LFS test system according to an embodiment of the present invention that illustrates data flows associated with a non-LFS test scenario.
Figure 9:
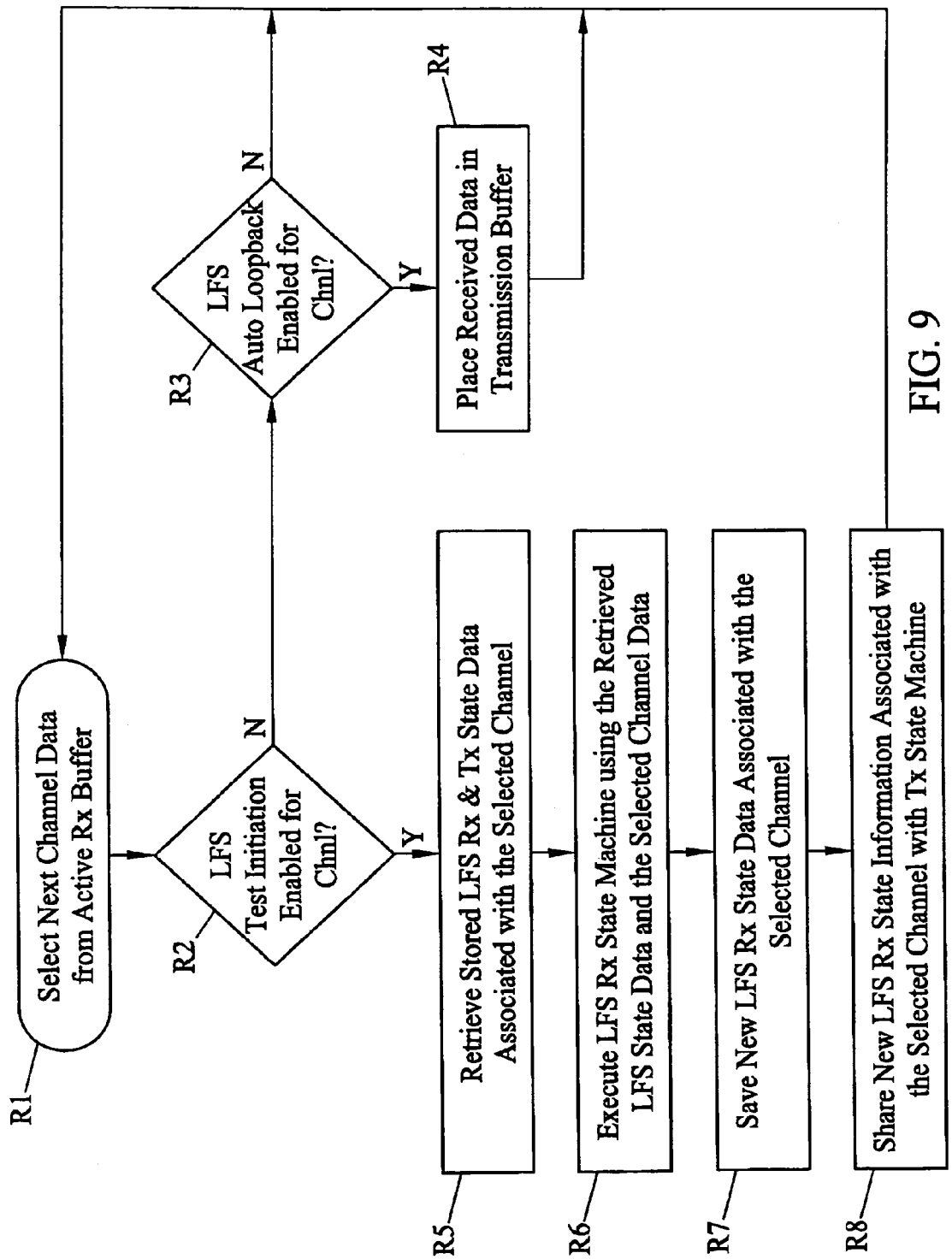
FIG. 9 is a flow diagram illustrating exemplary LFS processing associated with a receive-side LFS state machine according to an embodiment of the present invention.
Figure 10:
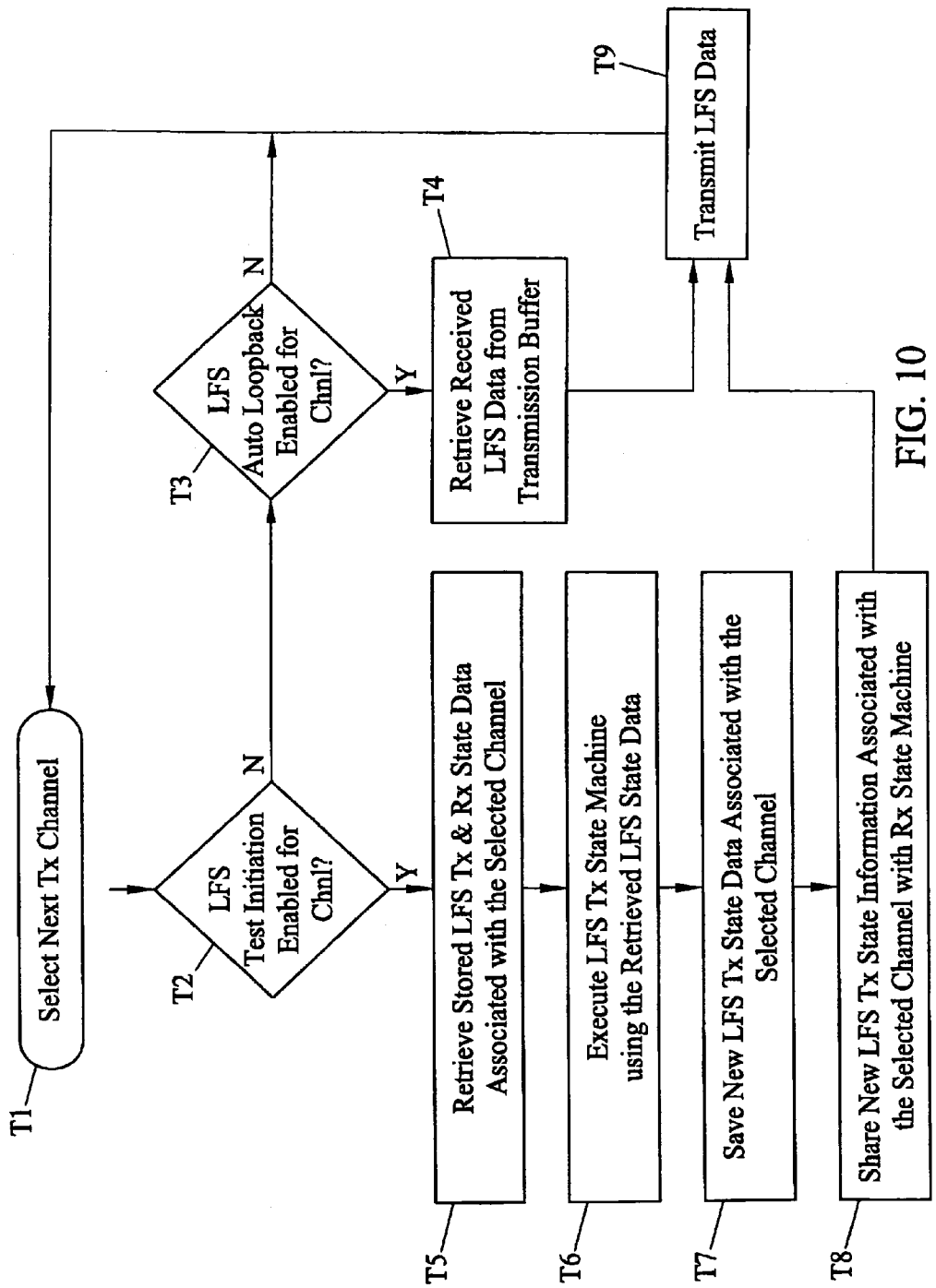
FIG. 10 is a flow diagram illustrating exemplary LFS processing associated with a transmit-side LFS state machine according to an embodiment of the present invention.
Figure 11:
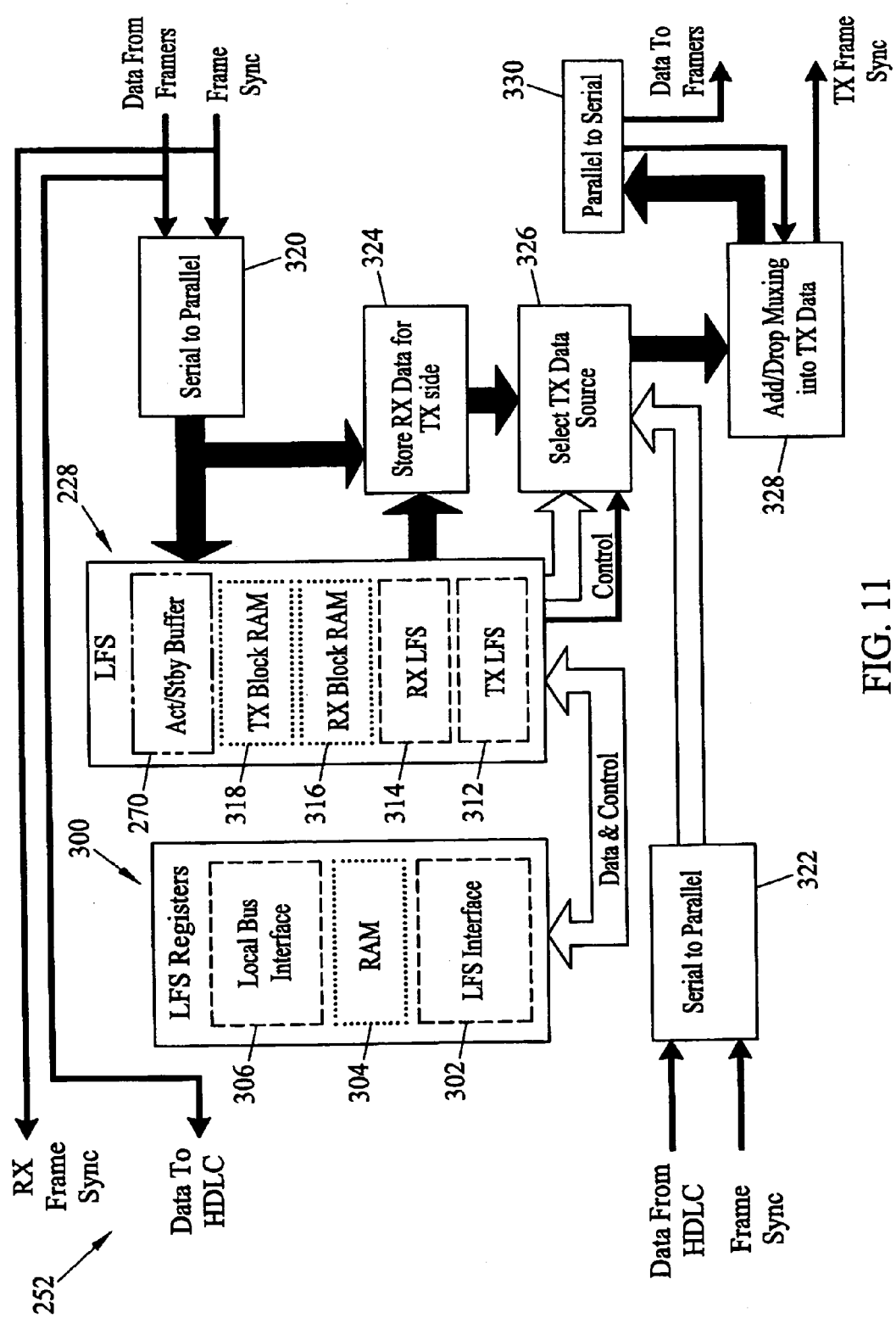
FIG. 11 is a block diagram of an FPGA implementation of a multi-port, multi-channel LFS test system according to an embodiment of the present invention that illustrates data flows associated with an LFS loopback test scenario.
Figure 12:
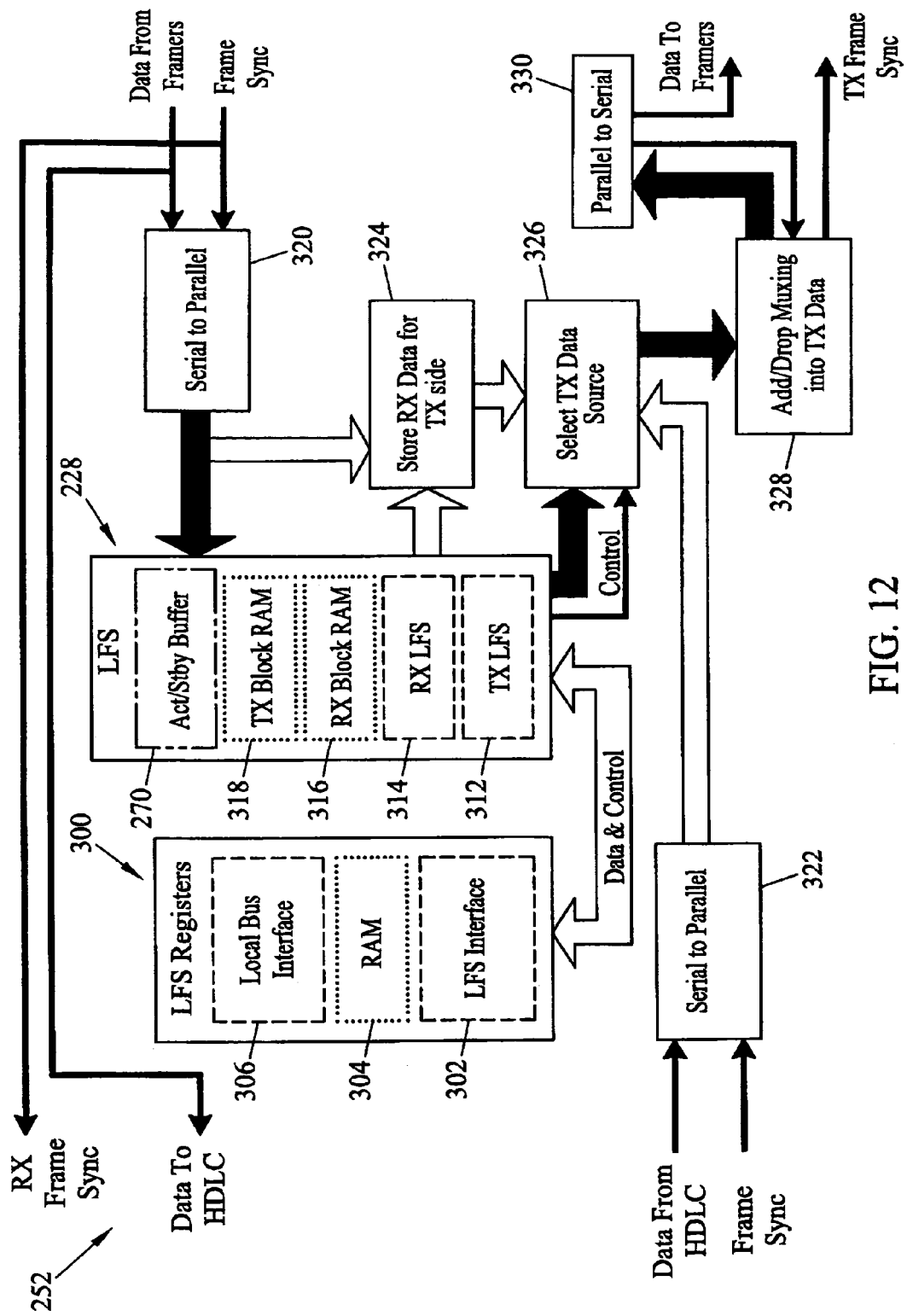
FIG. 12 is a block diagram of an FPGA implementation of a multi-port, multi-channel LFS test system according to an embodiment of the present invention that illustrates data flows associated with an FPGA-initiated LFS test scenario.

FIGS. 8, 11, and 12 illustrate several exemplary LFS test scenarios that may be encountered by a multi-port, multi-channel LFS system of the present invention. FIGS. 9 and 10 may be used in conjunction with FIGS. 8, 11 and 12 to illustrate basic Rx- and Tx-side LFS processing steps, respectively. It will be appreciated that the processing steps presented in FIGS. 9 and 10 are merely illustrative of high-level processing operations, and that the implementation of such operations in hardware and software may involve the execution of many associated tasks, such as memory read/write operations, register loading operations, arithmetic operations, etc.

In any event, presented in FIG. 8 is a system block diagram that illustrates an exemplary FPGA implementation of a multi-port, multi-channel LFS test system of the present invention, similar to that illustrated in FIG. 7. More particularly, FIG. 8 illustrates a scenario in which data is received on a DS-0 channel that has not been placed in an LFS test mode. In this case, inbound data received on the channel is presented to both the Rx side of the LFS state machine 228, as well as HDLC element 260 (FIG. 5). As indicated by step R1 in the Rx-side processing flow diagram shown in FIG. 9, Rx state machine 314 selects the DS-0 channel for processing and first checks to determine whether an LFS test mode has been enabled for the selected channel. In one embodiment of the present invention, LFS test mode for the channel is determined by accessing a channel-specific LFS initiation configuration register (step R2), such as that presented below in Table 5.

TABLE 5

LFS Initiation Configuration Register

| Bit 7 | Bit 6 | Bit 5 | Bit 4 | Bit 3 | Bit 2 | Bit 1 | Bit 0 |
|---|---|---|---|---|---|---|---|
| D7 | D6 | D5 | D4 | D3 | D2 | D1 | D0 |

D0: LFS Initiation State Machine Enable/Disable. Setting this bit enables the LFS Initiation State Machine.
D4-D1: LFS Command Code. These four bits form an LFS Command Code. See Table 6 for exemplary command codes.
D5-D6: Not used.

A channel-specific LFS initiation configuration register may be implemented using hardware logic elements (e.g., flip-flop elements, etc.), or, alternatively, one or more "virtual" registers may be implemented using random access memory (RAM). In any event, data similar to that shown in Table 5 is maintained for each DS-0 channel that the LFS system is adapted to service, and this data is used to determine whether LFS test initiation has been enabled for the DS-0 channel, and if so, what type of LFS test is to be initiated/executed. In the exemplary register presented in Table 5, bit 0 indicates whether LFS test initiation is enabled or disabled, and bits 1 through 4 contain an LFS command code value, which identifies the particular type of LFS test or LFS action to be initiated or executed. Exemplary LFS command codes and a description of their functions are presented below in Table 6.

TABLE 6

LFS Initiation Configuration Register Command Codes

| Code | Function |
|---|---|
| 0 | No Action |
| 1 | Initiate LFS Latching Loopback. Must be written when the LFS state machine is in the IDLE state. Inhibits DMA transfers and sends the LFS sequence (TIP -> LSC -> LBE -> REP*[ONES -> LBE] -> FEV) to the line, using the values written to the LSC and REP registers before this command was written. Leaves LFS state machine in the SEQUENCE SENT state after [30 + (20 * REP)] ms. |
| 2 | Initiate LFS Non-Latching Loopback. Must be written when the LFS state machine is in the IDLE state. Inhibits DMA transfers and sends the LFS loopback code written to the LSC register before this command was written. Leaves LFS state machine in the SEQUENCE SENT state after 10 ms. |
| 3 | Initiate LFS Manual Loopback. Must be written when the LFS state machine is in the IDLE state. Inhibits DMA transfers and sends test data to the line, using the values written to the test data and test pattern registers. Leaves the LFS state machine in the TRANSMIT TEST DATA state after 5 ms. |
| 4 | Start/Resume/Resync Test. When written while the LFS state machine is in the SEQUENCE SENT state, the LFS test will start or resume. When written in the TRANSMIT TEST DATA state, the LFS test will resync to the test data pattern. The command is ignored in all other states. Inhibits DMA transfers and sends test data to the line, using the values written to the test data and test pattern registers. Leaves the LFS state machine in the TRANSMIT TEST DATA state. The minimum time to reach the TRANSMIT TEST DATA state is 6 ms. |
| 5 | Clear Latching Loopback. When written while the LFS state machine is in the IDLE state or while performing/initiating an LFS Latching Loopback Test, inhibits DMA transfers and sends TIP to the line. The command is ignored in all other states. Leaves the LFS state machine in the LFS CLEARING state if the loopback didn't release or in the IDLE state if the loopback did release. The minimum time to reach the IDLE state after issuing this command is 15 ms. |
| 6 | Stop LFS Test. When written while the LFS state machine is in the LFS CLEARING state or while performing/initiating an LFS Non-Latching or Manual Loopback Test, allows DMA transfers and leaves the LFS state machine in the IDLE state after 5 ms. The command is ignored in all other states. |
| 7 | Verify Looping Point. When written while the LFS state machine is in the TRANSMIT TEST DATA state and performing an LFS Latching Loopback Test, inhibits DMA transfers and sends LBE to the line. Leaves the LFS state machine in the SEQUENCE SENT state after 10 ms. The command is ignored in all other states. |
| 8 | Inject Errors. When written while the LFS state machine is in the TRANSMIT TEST DATA state, inverts the next six bits of test data to be transmitted causing 6 bit errors to be injected. The command is ignored in all other states. |
| 9 to F | No Action |

The LFS initiation configuration data maintained for each DS-0 channel may be controlled by an external software process. An operator using an administrative software interface may specify the LFS initiation configuration settings (e.g., LFS initiation configuration register values) for each DS-0 channel serviced by the LFS system.

Returning to FIG. 9, a check is also made of an automatic loopback status register values associated with the selected channel to determine whether the channel is set to passively respond or loopback LFS test data sent by a remote LFS test initiating node (step R3). An exemplary automatic loopback status register is presented in Table 7, which includes a line loopback state indicator that is stored in bit 0 and a new LFS codeword indicator that is stored in bit 1. With regard to the line loopback state indicator, a bit value of 0 indicates that line loopback is inactive for the channel, and a bit value of 1 indicates that line loopback is active for the channel.

TABLE 7

LFS Automatic Loopback Status Register

| Bit 7 | Bit 6 | Bit 5 | Bit 4 | Bit 3 | Bit 2 | Bit 1 | Bit 0 |
|-------|-------|-------|-------|-------|-------|-------|-------|
| D7    | D6    | D5    | D4    | D3    | D2    | D1    | D0    |

D0: Indicates the state of the Line Loopback. When set, the loopback is active and any data received from the line will be received by the interface hardware and retransmitted to the line. When clear, the loopback is inactive and data will be transmitted and received normally.
D1: When set, this bit indicates that a new LFS codeword has been received. This bit is set when an LFS codeword has been received and it is cleared when the LFS Received Code Register is read.
D7-D2: Reserved for future use.

Returning to the exemplary scenario presented in FIG. 8, a check of the LFS initiation configuration register data for the selected DS-0 channel indicates that LFS test initiation is disabled (i.e., bit 0=0), and a check of the automatic loopback status register indicates that line loopback is inactive for the channel (i.e., bit 0=0). As such, LFS state machine element 228 simply ignores the received channel data, since no LFS test modes have been enabled for that channel. A control signal is communicated from LFS state machine 228 to data source select element 326, instructing the data source element to select outbound data received from HDLC element 260 for transmission on the DS-0 channel. Once again, because Rx and Tx processing may be performed asynchronously with respect to one another, the control signal described above may be buffered by data source selector element 326 until Tx processing of the corresponding DS-0 channel is performed, or, alternatively, Tx state machine 312 may communicate the above-described control signal during Tx-side processing of that DS-0 channel. Upon determining that LFS processing is not enabled for the currently selected channel, Rx-side processing continues with the next DS-0 channel.

Tx-side LFS processing in this example begins with the selection of same DS-0 channel discussed above with respect to Rx-side processing, as indicated by step T1 in the Tx-side processing flow diagram shown in FIG. 10. Once the Tx state machine selects the DS-0 channel for Tx-side processing, a check is made to determine whether an LFS test mode has been enabled for the selected channel. As described above, LFS test configuration for the channel may be determined by accessing a channel-specific LFS initiation configuration register (step T2), such as that presented in Table 5. In this example, a check of the LFS initiation configuration register data for the selected DS-0 channel indicates that LFS test initiation is disabled (i.e., bit 0=0) and a check of the automatic loopback status register (step T3) indicates that line loopback is inactive for the channel (i.e., bit 0=0). As such, LFS state machine 228 simply ignores the received channel data, since LFS testing is not enabled for that channel. As described above, a control signal may then be communicated from LFS state machine element 228 to data source select element 326, instructing the data source element to select outbound data received from HDLC element 260 for transmission on the DS-0 channel. Upon determining that LFS processing is not enabled for the currently selected channel, Tx-side processing continues with the next DS-0 channel.

From the example described above when LFS testing is disabled for a particular DS-0 channel (i.e., both LFS test initiation and LFS loopback), the LFS Rx and Tx state machines and their associated storage elements are idle during the Rx and Tx processing intervals associated with that channel.

FIG. 11 illustrates a scenario in which data is received for on a DS-0 channel that has been placed in LFS loopback mode by another node in the network. That is, LFS system 252 did not initiate the LFS test and is simply looping back LFS data that is originated by another node in the network. As in the previous example, inbound data received on the channel is presented to both the Rx side of the LFS state machine function 228, as well as the HDLC element 260 (FIG. 5). As indicated by step R1 in the Rx-side processing flow diagram shown in FIG. 9, the Rx state machine selects the next DS-0 channel for processing and checks to determine whether an LFS test mode has been enabled for the selected channel. LFS test mode for the channel is determined by accessing a channel-specific LFS initiation configuration register (step R2), such as that presented in Table 5. In this example, a check of the LFS initiation configuration register data for the selected DS-0 channel indicates that LFS test initiation is disabled (i.e., bit 0=0) and a subsequent check of the automatic loopback status register (step R3) indicates that line loopback is active for the channel (i.e., bit 0=1).

Upon determining that the selected channel has been placed in automatic loopback mode, the received line data is temporarily buffered in a storage element 324 that is accessible by the LFS system. Once the received line data is buffered for eventual loopback to the LFS test initiating node, Rx-side processing may continue with the next DS-0 channel.

Tx-side LFS processing in this example begins with the selection of the same DS-0 channel described above with respect to Rx-side processing, as indicated by step T1 in the Tx-side processing flow diagram shown in FIG. 10. Once the Tx state machine selects the DS-0 channel for Tx-side processing, a check is made to determine whether an LFS test mode has been enabled for the selected channel. LFS test configuration for the channel may be determined by accessing a channel-specific LFS initiation configuration register (step T2), such as that presented in Table 5. In this example, a check of the LFS initiation configuration register data for the selected DS-0 channel indicates that LFS test initiation is disabled (i.e., bit 0=0) and a check of the automatic loopback status register (step T3) indicates that line loopback is active for the channel (i.e., bit 0=1).

As such, in step T4, LFS state machine 228 may retrieve, from storage element 224, the stored data that was previously received on the selected channel. With regard to the specific exemplary architecture illustrated in FIG. 11, LFS state machine 228 may communicate a data select control signal to output data source element 326, which instructs the data source element to read or retrieve the previously received channel data from storage element 324 and present this data to drop/add Tx mux 328 for subsequent transmission on the selected DS-0 channel (step T9). Upon directing the previously received LFS data associated with the selected channel to be transmitted or looped back to the originating LFS test node, Tx-side processing continues with the next DS-0 channel.

The final scenario presented in FIG. 12 illustrates the case where LFS data is received for on a DS-0 channel that has been placed in an LFS test initiation mode. That is, in FIG. 12, it is assumed that LFS system 252 has initiated an LFS test and is receiving LFS test data that has been looped back by another node in the network. As in the previous example, inbound data received on the channel is presented to both the Rx side of the LFS state machine 228, as well as the HDLC element 260 (FIG. 5). As indicated by step R1 in the Rx-side processing flow diagram shown in FIG. 9, Rx state machine 314 selects the next DS-0 channel for processing and checks to determine whether an LFS test mode has been enabled for the selected channel. LFS test mode for the channel is determined by accessing a channel-specific LFS initiation configuration register (step R2), such as that presented in Table 5. In this example, a check of the LFS initiation configuration register data for the selected DS-0 channel indicates that LFS test initiation is enabled (i.e., bit 0=1).

As indicated in step R5, previously stored LFS state and status information associated with the selected DS-0 channel is retrieved from Rx RAM element 316. This data may include LFS test mode information, LFS test pattern selection information, transmitted LFS test pattern data, etc. Once all previously stored Rx-side data (including data shared with the Rx-side by the Tx-side state machine) associated with the selected channel has been loaded into or made available to Rx-side state machine 314, Rx-side state machine 314 may process the data and generate new Rx state (step R6). Processing the data may include executing an LFS receive state machine, such as a latching loopback receive state machine to check whether received data contains certain LFS words (e.g., FEV, LSC, TIP). An example of the new Rx state information that may be generated and stored is the bits received for the test and type of test being performed. Information associated with the new Rx-side state is stored in Rx RAM element 316, as indicated in step R7. Some or all of the new Rx state information may also be shared with the Tx-side state machine (step R8). Additionally, Rx-state machine status information and processing results (e.g., bit error rate counts, etc.) may be shared with other software and hardware processes in the system, and may be stored in LFS register element 300.

Once the new Rx-side state information associated with the selected channel has been saved, Rx-side state machine 314 is free to begin processing the next DS-0 channel. Because the Rx- and Tx-side state machines 314 and 312 can operate asynchronously with respect to one another, Rx-side LFS state 314 machine is free to process a pool of multiple DS-0 channels (possibly associated with multiple different ports) in any order or sequence. Also, because received channel data is buffered using an active/standby storage architecture, Rx-side LFS processing may proceed at a rate that is much higher than the line rate of the individual DS-0 channels. Once again, a significant benefit of such an LFS processing system architecture involves the fact that such a system may simultaneously perform LFS testing for a plurality of DS-0 channels, while requiring only a single LFS state machine element (e.g., one Rx/Tx state machine pair).

Tx-side LFS processing in this example begins with the selection of the same DS-0 channel discussed above with respect to Rx-side processing, as indicated by step T1 in the Tx-side processing flow diagram shown in FIG. 10. Once the Tx state machine selects the DS-0 channel for Tx-side processing, a check is made to determine whether an LFS test mode has been enabled for the selected channel. LFS test configuration for the channel may be determined by accessing a channel-specific LFS initiation configuration register (step T2), such as that presented in Table 5. In this example, a check of the LFS initiation configuration register data for the selected DS-0 channel indicates that LFS test initiation is enabled (i.e., bit 0=1).

As indicated in step T5, previously stored LFS state and status information associated with the selected DS-0 channel is retrieved from Tx RAM element 318. This data may include LFS test mode information, LFS test pattern selection information, previously received LFS test pattern data, etc. Once all previously stored Tx-side data (including data shared with the Tx-side by the Rx-side state machine) associated with the selected channel has been loaded into or made available to Tx-side state machine 312, Tx side state machine 312 may process the data and generate new Tx state information (step T6). Processing the data may include executing the steps illustrated for the latching loopback initialization state machine in FIG. 4. State information that may be stored may include the transmitted data and the type of test being performed. Information associated with the new Tx-side state is stored in Tx RAM element 318, as indicated in step T7, Some or all of the new Tx state information may also be shared with the Rx-side state machine (step T8). Additionally, Tx-state machine status information and processing results may be shared with other software and hardware processes in the system and may be stored in LFS register element 300.

With regard to the exemplary architecture illustrated in FIG. 12, LFS state machine element 228 may communicate a data select control signal to output data source element 326, which instructs output data source element 326 to select the LFS data generated and output by Tx-side state machine 312 and present this data to drop/add Tx mux 328 for subsequent transmission on the selected DS-0 channel (step T9).

Once again, it will be appreciated that an active/standby output buffer, similar to that illustrated in FIG. 6 may be used to temporarily store LFS data that is to be transmitted. As such, Tx-side processing of a second DS-0 channel may begin and be completed before newly generated LFS data associated with the Tx-side processing of a preceding, first DS-0 channel is actually transmitted. In any event, once the new Tx-side state information associated with the selected channel has been saved and the new LFS data generated by the Tx-side state machine has been designated for transmission on the selected DS-0 channel, the Tx-side state machine is free to begin processing the next DS-0 channel. As described above, because the Rx- and Tx-side state machines 314 and 312 operate asynchronously with respect to one another, the Tx-side LFS state machine is free to process a pool of multiple DS-0 channels (possibly associated with multiple different ports) in any order or sequence. Also, because data to be transmitted is buffered using an active/standby storage architecture, Tx-side LFS processing may proceed at a rate that is much higher than the line rate of the individual DS-0 channels. Again, this characteristic enables an LFS test system of the present invention to simultaneously perform LFS testing/processing on a plurality of DS-0 channels, while requiring only a single LFS state machine (e.g., one Rx/Tx state machine pair).

Although the examples described above relate primarily to LFS testing of SS7 TDM signaling links, the present invention is not limited to performing LFS testing only or only testing SS7 TDM signaling links. The methods and systems described herein may be used to perform any loopback-based link integrity testing of data included in signaling or bearer channels in which the test being performed is implemented using a state machine. For example, the multi-channel state machine described herein may be used to simultaneously perform any one or more of the following tests for multiple bearer channels: perceptual speech quality measurement (PSQM), perceptual analysis and measurement system (PAMS), and perceptual evaluation of speech quality (PESQ), in a manner similar to that described with respect to testing multiple signaling channels. The bearer channels may originate or terminate at any suitable node that sends digitized bearer channel information, such as an end office or a media gateway.

In applying the methods and systems described herein to perceptual speech quality measurement, multiple speech channels may be simultaneously tested using a single PSQM state machine. In PSQM testing, digital samples of a speech signal are compared to a reference signal to produce a measurement that indicates the auditory distance between samples. In a multi-channel LFS testing implementation, samples from a transmitted speech signal may be compared to samples of a received speech signal to determine auditory distance. For each channel tested, current state information, such as the type of test being performed and the transmitted bits may be stored. When the state machine reaches the channel being tested again, the current state information can be loaded and used for comparison with the received signal. By storing the current state, the state machine is able to service multiple channels without requiring a complete re-start each time a channel is tested.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for performing link fault sectionalization (LFS) tests on a time division multiplexed (TDM) signaling link channel, the method comprising:
    (a) receiving first LFS data on a first TDM channel, executing an LFS test state machine, generating LFS state information based on the first test data, and storing the LFS state information;
    (b) repeating step (a) for at least one second TDM channel before new LFS data arrives for the first TDM channel;
    (c) receiving second LFS data on the first TDM channel;
    (d) loading the LFS state information generated for the first LFS data, executing the LFS test state machine using the LFS state information, and generating new LFS state information associated with the first TDM channel; and
    (e) storing the new LFS state information associated with the first channel; and
    (f) repeating steps (c)-(e) for at least one second TDM channel before new LFS data arrives for the first TDM channel.

2. The method of claim 1 wherein the first and second TDM channels comprise signaling channels.

3. The method of claim 2 wherein the first and second TDM channels comprise SS7 signaling links.

4. The method of claim 3 wherein the first and second TDM channels are associated with the same port.

5. The method of claim 3 wherein the first and second TDM channels are associated with different ports.

6. The method of claim 1 wherein the first and second TDM channels comprise bearer channels.

7. The method of claim 6 wherein the bearer channels comprise voice channels and the LFS test state machine implements a speech quality test.

8. The method of claim 7 wherein the voice channels pass through a media gateway.

9. The method of claim 1 where loading the LFS state information includes retrieving LFS state information from random access memory (RAM).

10. The method of claim 1 where executing the LFS test state machine includes executing a receive-side LFS test state machine and a transmit-side LFS test state machine.

11. The method of claim 10 wherein executing a receive-side state machine and a transmit-side state machine includes executing the receive-side state machine and the transmit-side state machine asynchronously with respect to each other.

12. The method of claim 1 wherein steps (a)-(f) are performed on a signaling link interface module.

13. The method of claim 1 wherein the LFS test state machine is implemented using a programmable logic device.

14. The method of claim 1 wherein the ILFS test state machine is implemented using a microprocessor.

15. The method of claim 1 wherein steps (a)-(f) are performed at a network routing node.

16. The method of claim 1 wherein the first and second TDM channels are associated with the same trunk.

17. The method of claim 1 wherein the first and second TDM channels are associated with different trunks.

18. A method for simultaneously performing link fault sectionalization (LFS) tests on multiple signaling channels using a single LFS processing function, the method comprising:
    (a) performing an LFS test for a first time division multiplexed (TDM) channel, wherein performing the LFS test includes:
        (i) receiving a first byte of test data on the first TDM channel; and
        (ii) using an LFS test processing function to generate state information based on the first byte of test data and store the state information; and
    (b) using the LFS test processing function to perform LFS test processing of a first byte of data associated with an LFS test on at least one second TDM channel prior to processing a second byte of data on the first TDM channel.

19. The method of claim 18 comprising loading the LFS state information generated for the first TDM channel and processing the second byte of data for the first TDM channel using the LFS state information.

20. The method of claim 18 comprising buffering received test data in an active/standby buffer element.

21. The method of claim 18 wherein the first and second TDM channels are associated with the same port.

22. The method of claim 18 wherein the first and second TDM channels are associated with different ports.

23. The method of claim 18 wherein the first and second TDM channels are associated with the same port.

24. The method of claim 18 wherein the first and second TDM channels comprise signaling channels.

25. The method of claim 18 wherein the fist and second TDM channels comprise bearer channels.

26. The method of claim 25 wherein the first and second TDM channels comprise voice channels and the LFS test processing function implements a speech quality test.

27. The method of claim 26 wherein the voice channels pass through a media gateway.

28. The method of claim 18 wherein the LFS test processing function comprises a single LFS test state machine for simultaneously performing LFS testing for multiple channels.

29. A system for performing link fault sectionalization (LFS) tests of time division multiplexed (TDM) channels, the system comprising:
    (a) a communications link interface module for transmitting and receiving LFS data associated with a plurality of TDM channels undergoing simultaneous LFS testing;

(b) state storage means for storing state information associated with LFS testing of the TDM channels;

(c) an LFS test state machine operatively associated with the communications link interface module for:
  (i) receiving test data associated with the TDM channels;
  (ii) accessing stored state information associated with the TDM channels from the state storage means;
  (iii) processing the LFS data for each signaling channel using the LFS state information stored for each channel and generating new LFS state information for each TDM channel; and
  (iv) storing the new LFS state information in the state storage means.

30. The system of claim 29 wherein the TDM channels comprise signaling channels.

31. The system of claim 30 wherein the signaling channels comprise SS7 signaling channels.

32. The system of claim 29 wherein the TDM channels comprise bearer channels.

33. The system of claim 32 wherein the bearer channels comprise voice channels and the LFS test state machine implements a speech quality test.

34. The system of claim 33 wherein the voice channels pass through a media gateway.

35. The system of claim 29 wherein at least some of the TDM channels are associated with the same port.

36. The system of claim 29 wherein at least some of the TDM channels are associated with different ports.

37. The system of claim 29 wherein the state storage means includes a random access memory (RAM).

38. The system of claim 29 wherein the LFS test state machine includes a receive side state machine and a transmit side state machine.

39. The system of claim 38 wherein the receive side state machine and the transmit side state machine operate asynchronously with respect to each other.

40. The system of claim 29 wherein the LFS test state machine is implemented using programmable logic.

41. The system of claim 29 wherein the LFS test state machine is implemented using a microprocessor.

42. The system of claim 29 including an active/standby buffer element for temporarily buffering received LFS test data.

* * * * *